(12) United States Patent
Karsch et al.

(10) Patent No.: US 8,232,694 B2
(45) Date of Patent: Jul. 31, 2012

(54) DRIVE UNIT

(75) Inventors: Hans-Ulrich Karsch, Grub am Forst (DE); Michael Friedrich, Coburg (DE)

(73) Assignee: Brose Fahrzeugteile GmbH & Co., Coburg (DE)

( * ) Notice: Subject to any disclaimer, the term of this patent is extended or adjusted under 35 U.S.C. 154(b) by 376 days.

(21) Appl. No.: 12/302,585

(22) PCT Filed: May 11, 2007

(86) PCT No.: PCT/EP2007/004177
§ 371 (c)(1),
(2), (4) Date: Apr. 22, 2009

(87) PCT Pub. No.: WO2007/137686
PCT Pub. Date: Dec. 6, 2007

(65) Prior Publication Data
US 2009/0236921 A1    Sep. 24, 2009

(30) Foreign Application Priority Data
Jun. 1, 2006 (DE) .................. 20 2006 008 652 U

(51) Int. Cl.
*H02K 11/00* (2006.01)
(52) U.S. Cl. ..................... 310/71; 310/83; 310/68 B
(58) Field of Classification Search ............. 310/68 B, 310/71, 83, 75 R
See application file for complete search history.

(56) References Cited

U.S. PATENT DOCUMENTS

| | | | |
|---|---|---|---|
| 5,453,649 A | 9/1995 | Blanchet | |
| 6,404,084 B1 * | 6/2002 | Niki et al. | 310/75 R |
| 6,903,473 B2 * | 6/2005 | Matsuyama et al. | 310/71 |
| 2005/0280324 A1 | 12/2005 | Yamashita et al. | |
| 2006/0181166 A1 * | 8/2006 | Saito et al. | 310/75 R |

FOREIGN PATENT DOCUMENTS

| | | |
|---|---|---|
| DE | 4225496 | 2/1994 |
| DE | 4337390 | 4/1995 |
| EP | 0538495 | 4/1993 |
| EP | 1087500 | 3/2001 |
| GB | 810977 | 3/1959 |

OTHER PUBLICATIONS

International Search Report, for corresponding International Application No. PCT/EP2007/004177, Oct. 8, 2007, in English and German languages.
International Preliminary Report on Patentability and the Written Opinion of the International Searching Authority, for corresponding International Application No. PCT/EP2007/004177, Jan. 13, 2009.

* cited by examiner

*Primary Examiner* — Dang Le
(74) *Attorney, Agent, or Firm* — Scott T. Weingaertner; Joseph D. Eng, Jr.; King & Spalding LLP

(57) ABSTRACT

A drive unit in particular for an actuating element of a motor vehicle, is described, which has a gear mechanism unit, a drive motor and a contacting unit, with the gear mechanism unit encompassing a first interface for a detachable attachment of the drive motor and a second interface for the detachable attachment of the contacting unit, and with the drive motor being energized by the contacting unit in the mounted condition. The interfaces of the gear mechanism unit are designed to energize the drive motor through the contacting unit, and a rotary sensor that can contact the contacting unit and can detect the rotation of a gear mechanism rotating element (for example 6) is provided. Such a drive unit is very flexible with regard to the applicable control- and/or regulating electronic system.

9 Claims, 2 Drawing Sheets

DRIVE UNIT

FIELD OF THE INVENTION

The invention relates to a drive unit, in particular for an actuating element of a motor vehicle, according to the preamble of claim 1.

BACKGROUND OF THE INVENTION

A drive unit of this type is known, for example from EP 0 538 495 A1. There, a window lifter drive with a gear unit, with a drive motor and with a contacting unit is proposed, the contacting unit being mountable as a separate component on the gear unit by guide means, and, in the mounted state, the drive motor, designed as a direct-current motor, being connected electrically to the contacting unit via a brush plate and thereby receiving current.

Further, EP 1 087 500 B1 discloses a drive unit, in particular for an actuating element of a motor vehicle, which comprises a gear unit, a drive motor and a contacting unit. In this, the contacting unit and the drive motor are mounted onto the gear unit via a fastening flange. Here, the contacting unit is mounted by means of snap clips on corresponding latching hooks of the fastening flange. Leadthrough orifices are provided for electrical contacting.

Furthermore, DE 42 25 496 discloses a drive unit for an actuating element of a motor vehicle, with a gear unit, with a drive motor and with a contacting unit, an intermediate frame, which connects the electric motor and the gear unit, being provided for applying current to the drive motor.

A drive unit of the type initially mentioned serves, for example, for moving an actuating element of a motor vehicle along its actuating travel. In order to achieve the required torque or the desired speed during the movement of the actuating element, the movement of the drive motor is converted into the desired output-side movement of the actuating element by means of the gear unit. An actuating element of a motor vehicle may be a side window, a sliding roof or an electrically actuable tailgate. Such an actuable actuating element, however, is also an electrically actuable side door or an electrically displaceable motor vehicle seat.

Although the requirements which a drive unit for a specific actuating element must fulfill are the same, a large number of design variants are necessary particularly in the automobile industry. In addition to frequently changing fastening positions, this applies particularly to the control or regulation electronics requirements which necessitate changes in or on the drive unit.

SUMMARY OF THE INVENTION

The object of the present invention is to configure a drive unit of the type initially mentioned, such that it can be adapted as simply and as cost-effectively as possible to changed technical needs particularly with regard to the electronics.

According to the invention, for a drive unit having the features of the preamble of claim 1, the object is achieved in that the interfaces of the gear unit are designed for applying current to the drive motor via the contacting unit, and in that a rotary sensor detecting the rotation of a rotary gear element and contactable with the contacting unit is provided.

The invention is in this case based on the consideration that the majority of model variants required in the automobile industry differ in the arrangement of the drive motor and gear unit. For this purpose, as a rule, a structural reorganization of the gear unit is necessary. On this premise, it is expedient, as far as possible, to design the activation or regulation of the drive motor such that high flexibility or adaptability is achieved in this respect. This is fulfilled in that the application of current to the drive motor connected to the gear unit takes place via the interfaces of the gear unit. In this case, to be precise, the contacting unit merely has to have a corresponding current application output which, when mounting has taken place, supplies the drive motor with the corresponding current application signals via the interfaces of the gear unit. This makes it possible to have a flexible configuration of the control or regulation electronics which is independent both of the gear unit and of the drive motor. Thus, in the simplest case, the drive motor is supplied merely with an on/off signal via the contacting unit. In another case, external control and/or regulation may be used, which supplies its current application signals to the drive motor via the contacting unit. Further, it is also possible to integrate control and/or regulation electronics into the contacting unit, so that only one energy supply needs to be delivered externally.

If a rotary sensor detecting the rotation of a rotary gear element and contactable with the contacting unit is provided, the regulation electronics or control electronics do not need to be structurally reorganized, in contrast to the prior art known hitherto, when the position of the drive motor with respect to the gear unit is changed. This is because the rotational movement of a rotary gear element, said rotational movement being used to regulate the drive motor, is detected independent of the position of the drive motor. In contrast to this, hitherto, the rotational movement of the drive motor has been detected via a rotary element assigned to it, in particular via its driveshaft. Which rotary gear element is detected is unimportant. This may be, in particular, a gearwheel or a rotary shaft.

In an advantageous embodiment, the interfaces of the gear unit are connected electrically to one another for the application of current to the drive motor. In this case, the application of current to the drive motor is integrated into the gear unit via the contacting unit. In this case, the drive motor is connected to the gear unit via the first interface, its driveshaft coming into operative contact with a rotary gear element and, at the same time, its current application input being contacted. When the contacting unit is put in place, its current application output is contacted via the second interface, so that the application of current to the drive motor is ensured via the electrical connection between the first and the second interface. In contrast to this design variant, alternatively, it is also conceivable to provide the application of current to the drive motor, that is to say the contacting of its current application input, via the second interface. In particular, the contacting of the current application input of the drive motor may be part of the contacting unit which is connected correspondingly to the gear unit during mounting. In this case, the contacting unit is to be put in place on the gear unit before the drive motor is mounted.

The rotary sensor may, in particular, be integrated into the gear unit. In this case, the contacting unit is contacted with the integrated rotary sensor via the second interface only when placed onto the gear unit. To increase flexibility in terms of various model variants, however, it is advantageous if the rotary sensor is fastened to the contacting unit and is contacted with it, and the second interface of the gear unit is designed for receiving the rotary sensor. In this case, the rotary sensor is assigned to the contacting unit and is mounted together with the latter on the gear unit. The advantage of this is that the gear unit can be produced without a rotary sensor, and that the contacting unit can be designed selectively with or without a rotary sensor for convenient or simple activation.

The rotary sensors used may basically be inductive, resistive or optical sensors. In the automobile industry, however, because of its simple mechanical configuration and its robustness, a Hall sensor has gained acceptance as a rotary sensor in drive systems of actuating elements. Expediently, therefore, the rotary sensor used is a Hall sensor. Usually, the movement of the drive of an actuating element is detected by means of a Hall sensor in that a ring magnet with alternate polarity is placed onto a driveshaft or onto a rotary element. If, however, a toothed disk is assigned to a rotary gear element, then a ring magnet may cost-effectively be dispensed with beneficially in manufacturing terms. In this case, the detection of the rotational movement takes place in that the permeability changing periodically during a rotation of the toothed disk is detected by the Hall sensor. The resolution in the detection of the rotational movement can thereby be changed by means of the number of teeth.

The toothed disk is, in particular, part of the contacting unit, the toothed disk cooperating with the rotary gear element after the contacting unit has been mounted. By means of this measure, further, the contacting unit is decoupled from the gear unit. Thus, for example, the resolution in the measurement of the rotational movement can be adapted to the desired regulation electronics by means of a corresponding configuration of the toothed disk assigned to the contacting unit. The gear unit itself is reduced to the necessary gear elements, with the exception of the corresponding interface.

In the simplest case of a contacting unit reduced to the application of current to the drive motor, this contacting element is reduced to the connection for an external feed line. The external control unit in this case regulates a switch-on or switch-off of the energy supply delivered via the feed line.

As already mentioned, in an advantageous design variant, control and/or regulation electronics connectable to the rotary sensor are integrated into the contacting unit. In this case, in particular, the regulation electronics utilize the output signals emitted by the rotary sensor and directly activate the drive motor correspondingly via the current application output. In addition to the advantage of a customer-specific contacting unit which can be put in place without a structural change in the gear unit, this variant affords the further advantage that it has relatively low sensitivity to electromagnetic noise fields because of the spatial proximity between the control or regulation electronics and the rotary sensor. In particular, it is in this case appropriate to integrate the noise suppression elements into the contacting unit.

The drive unit described is particularly suitable for use for driving an actuating element in a motor vehicle. In an advantageous design variant, the drive unit is employed in an electric window lifter system. In particular, in this case, the drive motor is employed for winding or unwinding a rope on which a fastening element for a window is mounted.

DETAILED DESCRIPTION OF THE INVENTION

Figure 1:
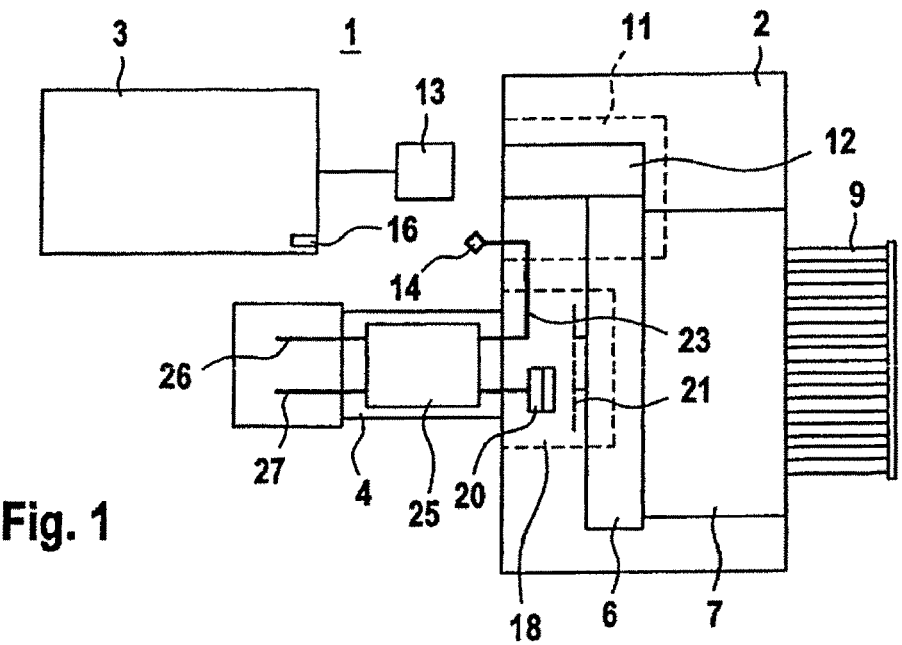
FIG. 1 shows diagrammatically a drive unit with a drive motor, with a contacting unit and with a gear unit, into which motor current application and a rotary sensor are integrated.

FIG. 1 illustrates diagrammatically a drive unit 1 which comprises a gear unit 2, a drive motor 3 and a contacting unit 4. The gear unit 2 has inside it a gearwheel 6 which is operatively connected on the output side to a splined profile 9 via further gear elements 7. The step-up from the drive side to the output side, required for driving, for example, an actuating element of a motor vehicle, is implemented via the gear elements 7. These may be, in particular, a gearwheel assembly. The splined profile 9 is designed to be coupled to the output, for example to the rope drum of a window lifter.

The gear unit 2 comprises, further, a first interface 11 which has a recess 12 for the driver 13 of the drive motor 3 and also a plug contact 14 for coupling to a correspondingly designed contact element 16 of the drive motor 3. The recess 12 is configured, in interaction with the gearwheel 6, in such a way that the driver 13, likewise a gearwheel, is meshed with the gearwheel 6 when the drive motor 3 is mounted. The type of coupling between the driver 13 and the gearwheel 6 may in this case be configured as spur-wheel or bevel-wheel toothing, depending on the desired form of construction of the drive unit 1.

When the drive motor 3 is mounted on the gear unit 2, the driver 13 drives the gearwheel 6 and consequently the gear; moreover, the current application input of the drive motor 3 is connected electrically to the plug contact 14 via the contact element 16 The fastening of the drive motor 3 to the gear unit 2 may in this case be carried out in a known way, for example by means of screwing, latching or clamping.

In addition, the gear unit 2 comprises a second interface 18 which serves for coupling the contacting unit 4. By means of the second interface 18, a Hall sensor 20 integrated into the gear unit 2 is connected to the contacting unit 4. The Hall sensor 20 in this case cooperates with a toothed disk 21 which is already premounted on the gearwheel 6 in the gear unit 2. During a rotation of the gearwheel 6, the toothed disk 21 travels along with its teeth on the Hall sensor 20 so that the latter detects a permeability changing periodically in time with the teeth.

Furthermore, the second interface 18 contains an electrical connection 23 which connects the current application output of the contacting unit 4 electrically to the plug contact 14 via the first interface 11.

When the contacting unit 4 is mounted onto the gear unit 2, the regulation unit 25 integrated into the contacting unit 4 is connected both via the plug contact 14 to the current application input of the drive motor 3 and to the output of the Hall sensor 20. The regulation unit 25 regulates the drive motor 3 to a desired rotational speed via the plug contact 14, the rotation of the gearwheel 6 detected by the Hall sensor 20 by means of the toothed disk 21 being used as a controlled variable. The contacting unit 4 has, as external connections, a plug connection 26 for applying current and a plug connection 27 for external control. The regulation electronics 25 thus regulate the drive motor 3 to the rotational speed corresponding to the control signals obtained via the plug connection 27.

Figure 2:
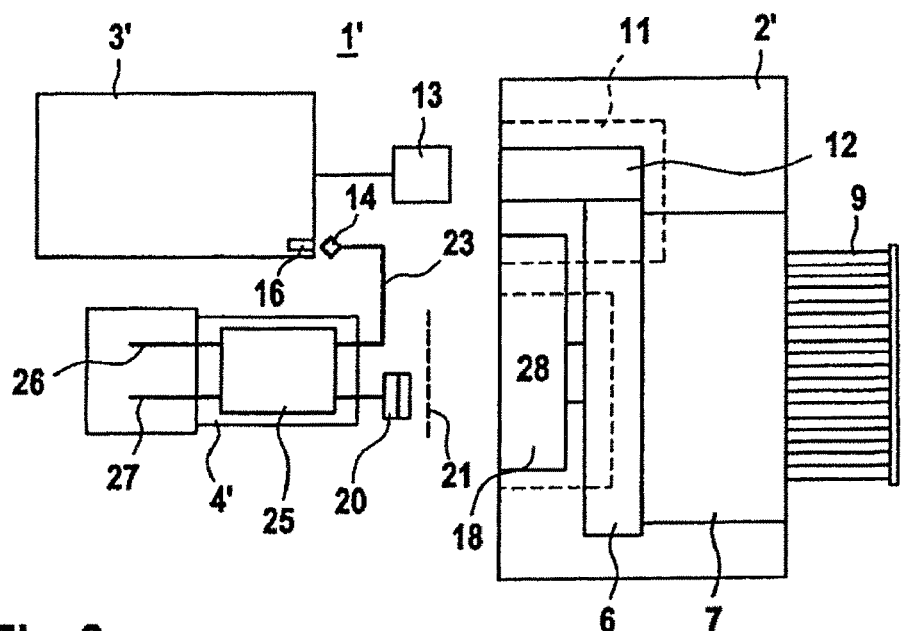
FIG. 2 shows diagrammatically a drive unit with a drive motor, with a contacting unit and with a gear unit, motor current application and the rotary sensor being assigned to the contacting unit.

FIG. 2, in turn, illustrates diagrammatically a drive unit 1' which is modified in relation to the drive unit 1 shown in FIG. 1. Once again, the drive unit 1' comprises a gear unit 2', a drive motor 3' and a contacting unit 4'. The gear unit 2' differs from the gear unit 2 according to FIG. 1 in that the first interface 12 for receiving the drive motor 3' is reduced essentially to the recess 12, via which the driver 13 cooperates with the gearwheel 6 after mounting. A further and essential difference is the configuration of the second interface 18. This is now configured essentially as a recess 28, via which the gear unit 2' can be connected releasably to the modified contacting unit 4'. In this case, the contacting unit 4' comprises a Hall sensor 20, now connected fixedly to it, and a toothed disk 21 and also the connecting line 23 to the plug contact 14.

Thus, when the contacting unit 4' is being mounted on the gear unit 2', on the one hand, electrical contacting with the current application input of the drive motor 3' is made. On the other hand, the toothed disk 21 comes into operative connection with the gearwheel 6, so that the Hall sensor 20 assigned to the contacting unit 4' can again detect the rotational movement of the gearwheel 6. By means of the drive unit 1' illustrated, various customer-specific drive electronics, which differ, for example, in the type of regulation or of the Hall sensor 20 used, can be implemented for a predetermined gear unit 2'. Also, slightly different drive motors 3' can be used, to which the regulation electronics 25 of the contacting unit 4' are then adapted. The plug connections 26 and 27 are constructed identically to FIG. 1.

Figure 3:
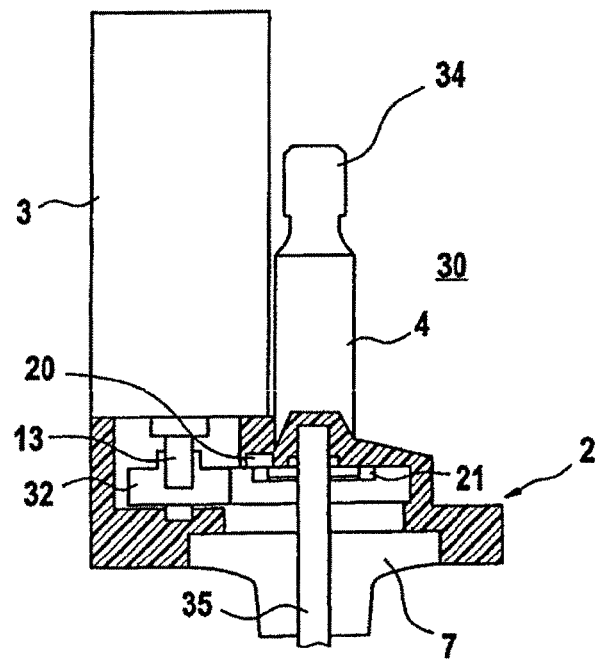
FIG. 3 shows diagrammatically a drive unit with a drive motor, with a gear unit and with a contacting unit in a modified type of construction.

FIG. 3 shows a form of construction of a drive unit 30 which is modified in relation to FIGS. 1 and 2. In the first place, once again, the gear unit 2, the drive motor 3 and the contacting unit 4 can be seen in the diagrammatic illustration. The contacting unit 4 has a plug 34 for an external connection.

In the gear unit 2 illustrated here, the driver 13 again engages into the toothed gear, formed from the gear elements 7, via an attached gearwheel 32.

In order to obtain a small construction space, the contacting unit 4 is put in place directly above the output shaft 35 of the gear unit 2. The toothed disk 21 can be seen there, which is coupled to a gear element, so that its rotation can be detected by the Hall sensor 20. The electrical connection between the contacting unit 4 and the drive motor 3 is not depicted.

Figure 4:
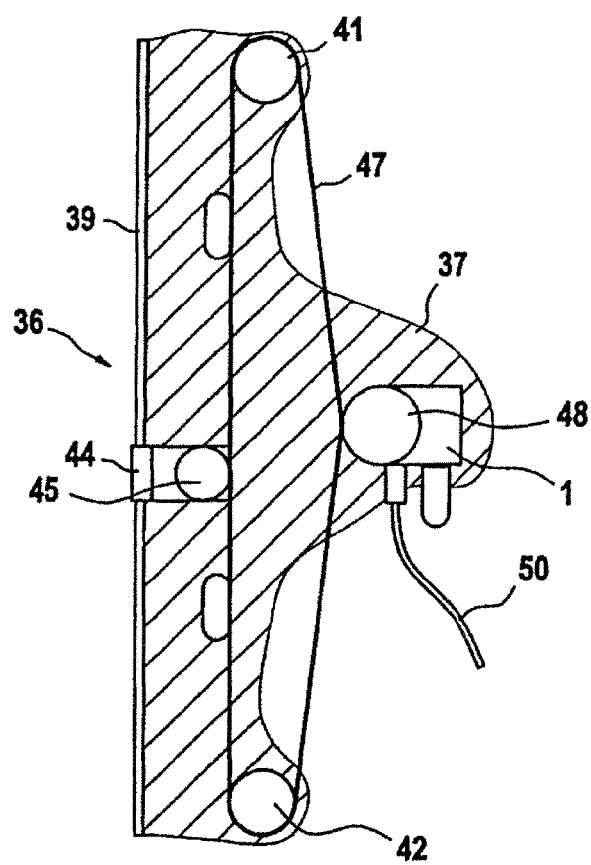
FIG. 4 shows diagrammatically a window lifter system having a mounted drive unit.

FIG. 4 illustrates diagrammatically a window lifter system 36, such as is used in the side door of a motor vehicle. The window lifter system 36 in this case consists of a carrying structure 37 on which a guide rail 39 is mounted and deflection pulleys 41 and 42 are mounted rotationally movably. A window holder 44 is placed displaceably on the guide rail 39 and is fixedly connected via a clamping roller 45 to a rope 47 running around the deflection pulleys 41, 42.

To drive the rope 47, further, the drive unit 1, the output shaft of which is connected fixedly to a rope drum 48, is mounted on the carrying structure 37. In this case, the rope 47 is wound around the rope drum 48, so that, during a rotation of the rope drum 48, the rope 47 runs around the deflection pulleys 41 and 42 according to the direction of rotation. In this case, the window holder 44 is moved either upward or downward along the guide rail 39.

The invention claimed is:

1. A drive unit for an actuating element of a motor vehicle, the drive unit comprising a gear unit, a drive motor and a contacting unit, the gear unit comprising
   a first interface for releasable fastening of the drive motor and
   a second interface for releasable fastening of the contacting unit,
   wherein, in the mounted state, current is applied to the drive motor via the contacting unit,
   wherein the first interface and the second interface of the gear unit are configured to apply current to the drive motor via the contacting unit, and
   wherein a rotary sensor is configured to detect the rotation of a rotary gear element of the gear unit and to be able to contact the contacting unit.

2. The drive unit according to claim 1, wherein the first interface and the second interface of the gear unit are connected electrically to one another for the application of current to the drive motor.

3. The drive unit according to claim 1,
   wherein the rotary sensor is fastened to the contacting unit and is in contact with it, and
   wherein the second interface of the gear unit is configured to receive the rotary sensor.

4. The drive unit according to claim 1,
   wherein the rotary gear element comprises a toothed disk, and
   wherein the rotary sensor is a Hall sensor that detects a change in permeability during the rotation of the toothed disk.

5. The drive unit according to claim 4, wherein the toothed disk is part of the contacting unit, and wherein the toothed disk cooperates with the rotary gear element after the contacting unit has been mounted.

6. The drive unit according to claim 1, wherein the contacting unit comprises a connection for an external feed line.

7. The drive unit according to claim 1, wherein control and/or regulation electronics connectable to the rotary sensor are integrated into the contacting unit.

8. A motor vehicle comprising an actuating element, wherein the actuating element is driven by a drive unit according to claim 1.

9. The motor vehicle according to claim 8, wherein the actuating element is an electric window lifter system.

* * * * *